(12) United States Patent
Rajappan et al.

(10) Patent No.: US 12,182,850 B2
(45) Date of Patent: Dec. 31, 2024

(54) SHOPPING SYSTEM AND METHOD

(71) Applicant: RETAILETICS SDN BHD, Selangor (MY)

(72) Inventors: Shaji Rajappan, Shah Alam Selangor (MY); Manirajah Kulanthavelu, Wilayah Persekutuan Putrajaya (MY)

(73) Assignee: RETAILETICS SDN BHD, Petaling Jaya (MY)

( * ) Notice: Subject to any disclaimer, the term of this patent is extended or adjusted under 35 U.S.C. 154(b) by 87 days.

(21) Appl. No.: 17/615,042

(22) PCT Filed: May 22, 2020

(86) PCT No.: PCT/MY2020/050036
§ 371 (c)(1),
(2) Date: Nov. 29, 2021

(87) PCT Pub. No.: WO2020/242290
PCT Pub. Date: Dec. 3, 2020

(65) Prior Publication Data
US 2022/0230228 A1 Jul. 21, 2022

(30) Foreign Application Priority Data
May 28, 2019 (MY) .............................. PI2019003022

(51) Int. Cl.
*G06Q 30/0601* (2023.01)
*G06N 20/00* (2019.01)
*G06Q 30/0207* (2023.01)

(52) U.S. Cl.
CPC ......... *G06Q 30/0633* (2013.01); *G06N 20/00* (2019.01); *G06Q 30/0207* (2013.01); *G06Q 30/0605* (2013.01); *G06Q 30/0641* (2013.01)

(58) Field of Classification Search
CPC .............. G06N 20/00; G06Q 30/0207; G06Q 30/0269; G06Q 30/06–0645; G06Q 30/08; G06Q 50/01; G16Y 10/00–90
See application file for complete search history.

(56) References Cited

U.S. PATENT DOCUMENTS 7,797,204 B2 * 9/2010 Balent ................ G06Q 30/0633
705/28
2001/0044751 A1 * 11/2001 Pugliese, III .......... G06Q 30/02
705/14.1

(Continued)

OTHER PUBLICATIONS

Sinha et al., "Automated Billing System using RFID and Cloud," 2019 Innovations in Power and Advanced Computing Technologies (i-PACT), vol. 1, Mar. 1, 2019; pp. 1-6. (Year: 2019).*

(Continued)

*Primary Examiner* — Adam L Levine
(74) *Attorney, Agent, or Firm* — Maschoff Brennan

(57) ABSTRACT

A shopping system (102) for facilitating shopping of customers from retailers is provided herein. The shopping system (102) includes a shopping list module (202) configured to enable a plurality of customers to create their shopping list having a plurality of items. The shopping system (102) further includes a retail module (204) configured to enable a plurality of retailers to provide a dynamic pricing and promotions for items in the shopping list. The shopping system (102) further includes a cart module (206) configured to enable the plurality of customers to choose a retailer based upon the pricing, and book a cart with the retailer.

15 Claims, 10 Drawing Sheets

(56) References Cited

U.S. PATENT DOCUMENTS

| | | | |
|---|---|---|---|
| 2008/0033857 A1* | 2/2008 | Moses | G07F 7/025 |
| | | | 705/35 |
| 2008/0238009 A1* | 10/2008 | Carpenter | B62B 3/1408 |
| | | | 280/33.992 |
| 2010/0179857 A1 | 7/2010 | Kalaboukis et al. | |
| 2012/0221393 A1 | 8/2012 | Ouimet et al. | |
| 2013/0110639 A1* | 5/2013 | So | G06Q 30/02 |
| | | | 705/14.66 |
| 2014/0095273 A1 | 4/2014 | Tang et al. | |
| 2015/0058154 A1* | 2/2015 | Appleyard | G06Q 30/0633 |
| | | | 705/26.4 |
| 2015/0294390 A1 | 10/2015 | Fan et al. | |
| 2018/0150851 A1* | 5/2018 | Ouimet | G06Q 30/02 |
| 2018/0276695 A1* | 9/2018 | Dione | G06Q 10/08 |
| 2018/0315111 A1* | 11/2018 | Alvo | G06Q 30/0633 |

OTHER PUBLICATIONS

Yih, "Pervasive Computing Technologies for Retail In-store Shopping," ICPS '05. Proceedings. International Conference on Pervasive Services, Publication Date Jan. 1, 2005, pp. 111-116. (Year: 2005).*

* cited by examiner

400

600

SHOPPING SYSTEM AND METHOD

FIELD OF THE INVENTION

Embodiments of the present invention, generally relate to shopping from offline retailers, and in particular relate to providing relevant promotional offers by offline retailers to their customers based on their actual needs.

BACKGROUND

Online stores are turning up the heat on brick & mortar retailers by sourcing products directly from manufacturers and distributors, giving consumers better choice, lower prices, delivery services, 24/7/365 access, and real-time engagement via live chat, social media and mobile applications. The online stores also have lot of insights into visitors' pre-shopping activities, that they can utilize for providing customers a personalized shopping journey, landing pages and sales strategy when the visitor lands at their store, and can even engage them instantly.

Online stores have lot of competitive edge over the offline retailers. This is because customers are overwhelmed by choices on online stores, but they don't get same experience in brick and mortar stores. Further, online stores provide convenience to shoppers to change their shopping preferences. Furthermore, online stores are able to provide personalization to customers as customers are able to view products, prices and availability on their fingertip on these online stores.

However, brick and mortar retailers or offline retailers don't have access to consumer wish list thereby causing them to waste tons of food they stock up to woo shoppers, but can't sell.

Further, offline retailers have zero clue/insights on what shoppers really want. Furthermore, the offline retailers can't offer personalizes shopping experience for the customers as it requires retailers to identify them when they enter the store, which is more difficult in a physical store.

Further, brick and mortar retailers (also called as offline retailers) have no clue who is in their stores, what they seek, what products or brands they are comparing, what they buy from competitors, or if they will even return after waiting in long checkout queues, which is common in most physical stores. The only insight these offline retailers have, is consolidated historical sales data (that most store managers see only weeks later), thus they are not able to match offers and shopping experiences of online stores. These retailers do not have real-time insights into fast-changing demand in the locations they serve. They use assumptions to plan inventory and prices. Inability to predict demand is resulting in huge inventory wastage and lost revenue opportunities, according to reports by Forbes, Forrester and other well-known analysts.

Thus consumers in south-east Asia and other parts of world, including millennials who still prefer the experience of physical stores, are largely dissatisfied with the overall shopping experience in brick and mortar retailers, lack of choice, in store services and personalization at brick & mortar retailers.

Therefore, there is a need for an improved system and method for offline shopping which solves above disadvantages associated with the conventional methods.

SUMMARY

According to an aspect of the present disclosure, a shopping system (102) for facilitating shopping of customers from retailers is provided herein. The shopping system (102) includes a shopping list module (202) configured to enable a plurality of customers to create their shopping list having a plurality of items. The shopping system (102) further includes a retail module (204) configured to enable a plurality of retailers to provide a dynamic pricing and promotions for items in the shopping list. The shopping system (102) further includes a cart module (206) configured to enable the plurality of customers to choose a retailer based upon the pricing, and book a cart with the retailer.

According to another aspect of the present disclosure, a computer-implemented method for facilitating shopping of customers from retailers is provided herein. The computer-implemented method includes enabling a plurality of customers to create their shopping list having a plurality of items. The computer-implemented method further includes aggregating the shopping lists of the plurality of customers, and sharing the aggregated shopping list with a plurality of retailers. The computer-implemented method further includes enabling the plurality of retailers to provide a dynamic pricing and promotions for items in the shopping list. The computer-implemented method further includes enabling the plurality of customers to choose a retailer based upon the pricing, and book a cart with the retailer.

The preceding is a simplified summary to provide an understanding of some aspects of embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

To facilitate understanding, like reference numerals have been used, where possible, to designate like elements common to the figures.

DETAILED DESCRIPTION

As used throughout this application, the word "may" is used in a permissive sense (i.e., meaning having the potential to), rather than the mandatory sense (i.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Figures 1, 2:
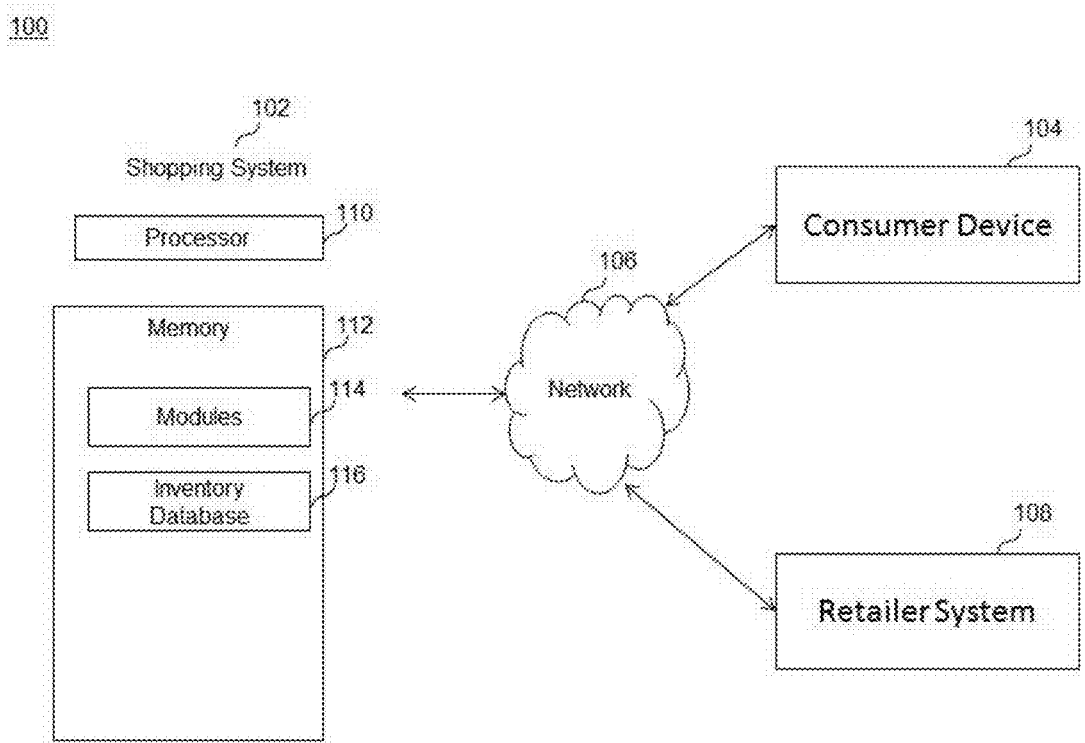
FIG. 1 is a block diagram depicting a network environment according to an embodiment of the present invention.
FIG. 2 is a block diagram of modules stored in memory, according to an embodiment of the present invention.

FIG. 1 illustrates an exemplary network environment (100) where various embodiments of the present invention may be implemented. The network environment (100) includes a shopping system (102) connected to various consumer devices (104) and various retailer systems (108) via a network (106). In an embodiment, the retailers (108) are offline retailers or brick and mortar retailers. Further, the consumers (104) are shoppers who wish to purchase various items of their need from these retailers (108). The Network (106) may include, but is not restricted to, a communication network such as Internet, PSTN, Local Area Network (LAN), Wide Area Network (WAN), Metropolitan Area Network (MAN), and so forth. In an embodiment, the network (106) can be a data network such as the Internet. Further, the messages exchanged between the shopping system (102) and the consumers devices (104) can comprise any suitable message format and protocol capable of communicating the information necessary for the shopping system (102) to create a shopping list having items currently desired by the customers and provide the shopping list to the retailers systems (108). The retailers may utilize the shopping list to get insights into customers real time demand and may offer promotions on the items in demand to increase their sales.

In an embodiment of the present invention, the shopping system (102) may be a computing device. In operation, a user of the consumer device (104) may access the shopping system (102) to provide his/her shopping preferences or shopping items that he intends to buy in near future. The shopping system (102) includes a processor (110) and a memory (112). In one embodiment, the processor (110) includes a single processor and resides at the shopping system (102). In another embodiment, the processor (110) may include multiple sub-processors and may reside at the shopping system as well as the retailer system (108) and consumer device (104).

Further, the memory (112) includes one or more instructions that may be executed by the processor (110) to enable a plurality of customers to create their shopping list, to share the shopping list with a plurality of retailers, and to enable the plurality of customers to book a cart with the plurality of retailers. In one embodiment, the memory (112) includes the modules (114), an inventory database (116), and other data (not shown in figure). The other data may include various data generated during processing the shopping list of customers. In one embodiment, the database (116) is stored internal to the shopping system (102). In another embodiment, the database (116) may be stored external to the shopping system (102), and may be accessed via the network (106). Furthermore, the memory (112) of the shopping system (102) is coupled to the processor (110).

Referring to FIG. 2, the modules (114) includes a shopping list module (202), a retail module (204), a cart module (206), and a reward module (208). The modules (114) are instructions stored in the memory and may process shopping list to provide enhanced shopping experience for the consumers and retailers.

Figure 3:
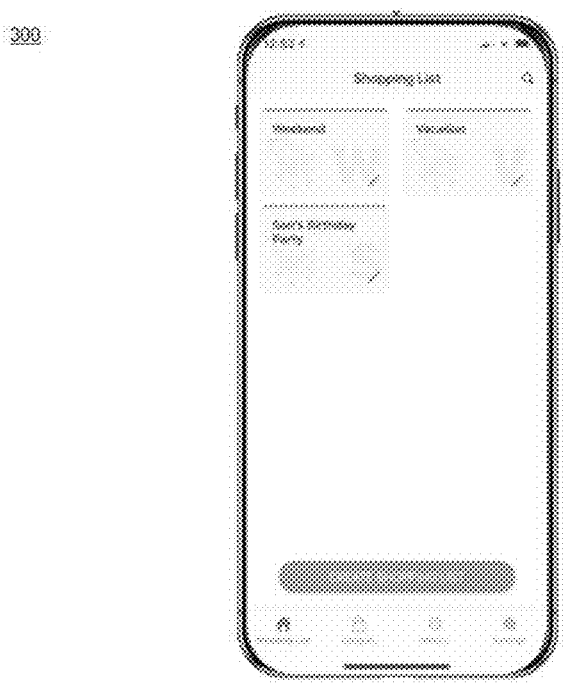
FIG. 3 is a schematic diagram of exemplary shopping list options for the customer, according to an embodiment of the present invention.
Figure 4:
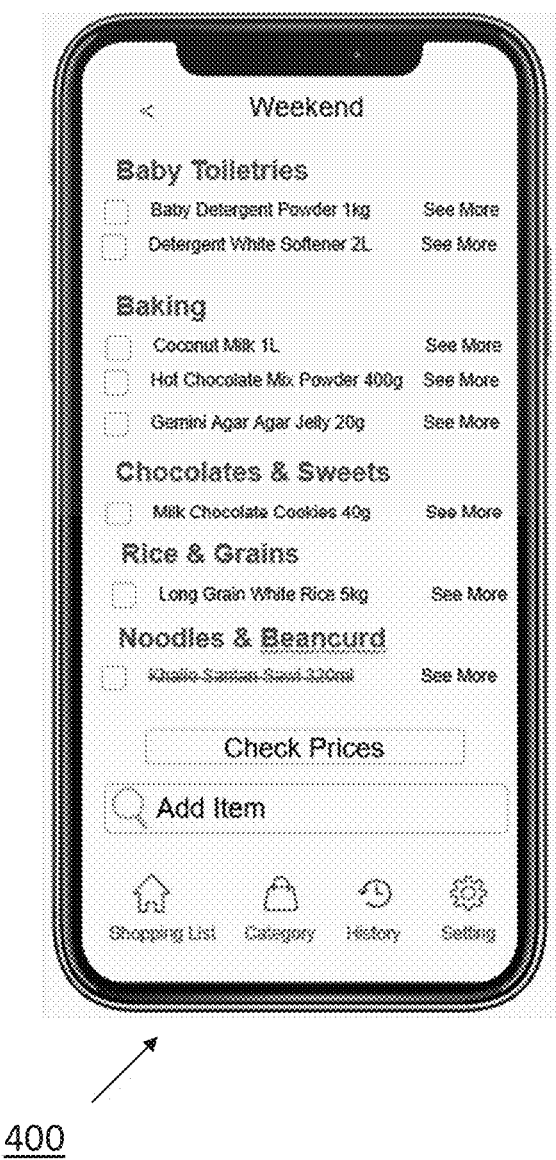
FIG. 4 is a schematic diagram of exemplary weekend shopping list created by the customer, according to an embodiment of the present invention.
Figure 5:
FIG. 5 is a schematic diagram of exemplary price list for the shopping list created by a customer, according to an embodiment of the present invention.

According to an embodiment of the present invention, the shopping list module (202) is configured to enable a plurality of customers to create their shopping list. In an embodiment, the shopping list may be for weekend, vacation, and birthday party, as shown in FIG. 3. In an embodiment, the shopping list module (202) is configured to enable customers to search an item of their choice, and add the item to their shopping list. In an embodiment, the customers may search item based on product type, product, and brand. For example, the customer may search 'Jack Daniel' whisky item. Similarly, the shopping list module (202) is configured to enable the customer to create a shopping list of his/her weekly grocery items, as shown in FIG. 4. Further, the shopping list module (202) is configured to enable the customers to check prices of each item in the shopping list and whole shopping list, as shown in FIG. 5.

Further, the shopping list module (202) is configured to enable the plurality of customers to provide his/her shopping preferences and home inventory. The customer may create multiple shopping lists as well, for example, for their weekend, party, vacation or kids. The shopping list module (202) is configured to enable the customers to search an item and add items from a consolidated list of goods/products from participating merchants/retailers to one or more of their shopping lists. The shopping list module (202) is configured to enable the customers to search and add recipes or write one into favorite's recipes and share them.

In case, the item is available in the inventory database (116), the shopping list module (202) is configured to find the item, and enable the customer to add the item to his/her shopping list. Further, the shopping list module (202) is configured to display the available items of customer choice on a dashboard. In an embodiment, the shopping list module (202) is further configured to enable the plurality of customers to check prices of items in the shopping list according to different retailers on the dashboard, as shown in FIG. 5.

Further, the shopping list module (202) is configured to enable consumers to compare real-time prices of items in their list across multiple retailers, track existing stock at home or office and expiry dates of items. Those skilled in the art will appreciate that the shopping list may provide real time information to the customers/consumers/shoppers about availability of items with different retailers with prices to assist them to plan purchase of the list as per their budget. For example, the customer is able to check dynamic pricing of items in the shopping list and may book the product whenever he gets best offer.

The shopping list module (202) is further configured to share their shopping list with their family members and friends. The shopping list module (202) is further configured to enable the family members and friends to edit the shopping list. For example, it is possible that the family members and friends may want to add an item of their choice or edit an item in the shopping list according to their choice or experience. The shopping list module (202) is further configured to enable the shoppers to update the shopping list themselves.

Further, according to an embodiment of the present invention, the shopping list module (202) is configured to enable consumers to keep track of unused stock of products at home/pantry/larder, based on purchased items by the users in shopping history. In an embodiment, the shopping list module (202) may utilize artificial intelligence such as machine learning to keep track of unused stock of products at the consumer's home/pantry/larder. For example, if the consumer ordered a product before 1 month, and is again looking for same product without using/finishing earlier product, the shopping list module (202) may remind the consumer that this product was also ordered during last month. Those skilled in the art will appreciate that it will facilitate reduction in wastage of products.

Further, the shopping list module (202) is configured to enable the consumers to keep track of expiry date of stock of products at home/pantry/larder. In one embodiment, the shopping list module (202) is configured to utilize the inventory data provided by retailers to keep track of the expiry date of the products. In another embodiment, the shopping list module (202) enables the consumers to manually add such information about the products. For example, if the consumer ordered a product before some months, and the consumer has not used the product, while the product may be approaching its expiry date soon. The shopping list module (202) may remind the consumer that this product was ordered on last month and is fast approaching its expiry date, so that the user may consume it as soon as possible. Those skilled in the art will appreciate that it will facilitate reduction in wastage of products.

Further, according to an embodiment of the present invention, the shopping list module (202) is configured to suggest to consumers various items or recipes, based on unused stock in pantry/larder when connected with retailer or partner recipe portals. For example, if the consumer ordered a packet of breads during last purchase without butter jam or Nutella, the shopping list module (202) may suggest the consumer to order the jam or Nutella from a retailer's store. Those skilled in the art will appreciate that it will facilitate reduction in wastage of products and enhance the user experience by providing value to the customer.

Further, according to an embodiment of the present invention, the shopping list module (202) is configured to keep a track of consumer's likes/choice and preference about preferred products and a preferred brand of products. Further, the shopping list module (202) is configured to keep a track of user dislikes of products from products list that the consumer usually drops or no longer purchase from their usual lists. The shopping list module (202) is configured to store the user's choices in the database and utilize the choices to profile the user. Based upon the profile, the shopping list module (202) may suggest suitable products from nearby retailers (based upon mobile location) as and when they are available or available at lower price. Those skilled in the art will appreciate that such profiling of users would enable higher degree of personalization for each user and better services for the user.

In an embodiment, the shopping list module (202) is further configured to enable the retailers to register themselves with the shopping system and to integrate their inventory records or database with the inventory database (116). The shopping list module (202) is further configured to enable the retailers to list services provided by them for customers. Further, the shopping list module (202) is configured to display items required by the customers on the dashboard. Those skilled in the art will appreciate that the retailers have access to real time demand of the customers to manage their stock keeping units in the inventory and offer various promotions to increase their sales.

The retail module (204) is configured to aggregate the shopping lists of the plurality of customers, and share the aggregated shopping list with a plurality of retailers, manufacturers, and fast moving consumer goods company (FMCG). The retail module (204) is further configured to tag geographic location of the plurality of customers and provide to the plurality of retailers, manufacturers and companies. Those skilled in the art will appreciate that such geographical tagging will help retailers and manufacturers to assess demand of different items/products from different locations/regions.

Further, the retail module (204) is configured to aggregate local demand of customers for a geographic location, and further to provide the aggregated local demands to the nearby offline stores for same geographic locations, based upon mobile locations of the customers. Those skilled in the art will appreciate that such geographical tagging will help retailers and manufacturers to assess demand of different items/products from nearby locations and manage their inventory as per local demand.

The retail module (204) is configured to enable the retailers to upload their inventory (for example, using API), to the inventory database (116). The retail module (204) is further configured to map the shopping list to databases of the plurality of retailers and inform the retailers about their inventory status, based on the shopping list. For example, it is possible that inventory of a retailer for a particular item that is in a lot of demand, may be empty or will soon become empty. The retail module (204) may further map the shopping list to retailer stock keeping unit (SKU) databases and may create a single database of SKUs from all participating merchants automatically. The retail module (204) may also remove duplicates and correct errors, while retaining individual merchant SKU databases.

Further, according to an embodiment of the present invention, the retail module (204) is configured to utilize artificial intelligence such as machine learning to predict items demanded by customers in future, so as to assist the retailers in managing their inventory. For example, some items may be demanded by customers at particular times and the machine learning may determine such patterns to advice retailers to manage their inventory in warehouses. Further, the retail module (206) is configured to utilize artificial intelligence to suggest suitable pricing to the retailers that the customers are likely to go ahead. In an embodiment, based on such demand of customers, the retailers may launch various marketing campaigns to customers via email or SMS.

Figure 6:
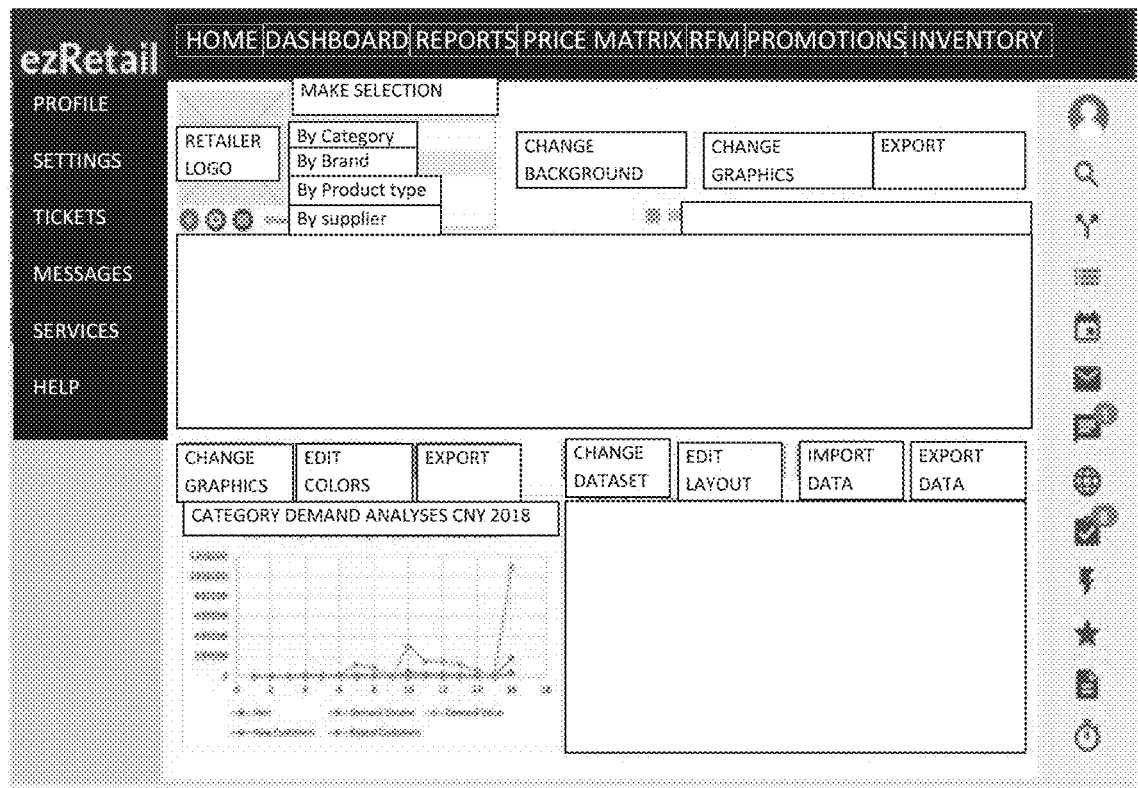
FIG. 6 is a schematic diagram of exemplary real time aggregated hyper local demand provided to retailers, according to an embodiment of the present invention.

The retail module (204) is configured to enable the retailers to access aggregated shopping list data. In an embodiment, the retailers may access the shopping lists via dashboards of aggregated shopping list data, as shown in FIG. 6. The retail module (204) is configured to provide an interface between the retailers and customers that allows retailers to engage customers inside the store or outside the store. The retail module (204) is configured to provide demographic details of the customers to the retailers. In an embodiment, the demographic details may be used by the retailers to provide suitable promotional offers to the customers. For example, a particular section of the populations (like adults and old people) are more likely to use fitness products, thus the retailers may tailor their promotions accordingly so as to offer discounts to such customers and increase sales and revenue.

The retail module (204) is further configured to enable the plurality of retailers and manufacturers to provide a dynamic price and promotions for items in the shopping list.

Those skilled in the art will appreciate that different retailers may have tie-up with different brands or manufacturers, and may provide promotions and discount on items accordingly. For example, a particular retailer may provide discount on beverage items, while another retailer may provide discount on electronic items. For example, a particular retailer may offer '3' products in price of '2' products. Further, the retailer may club a group of different type of products in a bundle, and offer them at a discounted price.

Similarly, a particular retailer may provide discount (for example, 20%) on butter products, while another retailer may provide discounts on cooking oil products. Further, different retailers and manufacturers may offer discounts on particular days like Christmas. In an embodiment, the retail module (204) is configured to display promotions (such as promotions this week in the store) on a display of home page of the portal. Those skilled in the art will appreciate that such promotions enables the retailers to engage the customers and increase their sales.

In an embodiment, the cart module (206) is configured to enable the plurality of customers to choose a retailer based upon the pricing, and book a cart with the retailer. The customer may add items of the shopping list to a cart of the chosen retailer and book the cart. In another embodiment, the cart module (206) is configured to enable the customers to make payment for the shopping list as well. Further, in an embodiment, the cart module (206) may provide list of items of the shopping list to the retailer (such as offline retailer) to keep ready those items of the cart whenever customer visits the store.

Further, the cart module (206) is configured to enable the retailers to identify such shoppers when they enter the store, and personalize prices, promotions and messages based on their profile. When customer visits the store, the retailer may direct the customer to a payment gateway that may provide different payment options to the customer like Internet banking, Credit card, debit card or digital wallet (in case payment has not been done). The retailers may provide enhanced shopping experience to such customers like these customers may pay and checkout in-cart without queuing.

The reward module (208) is configured to enable the retailers to provide rewards to the plurality of customers based upon the payment by the customer. In an embodiment, based on offers of a particular retailer, the reward module (208) may provide reward points based on volume of purchase done by customer, and may add reward points in an account of the customer. The reward points may be exchanged for items or cash as reward by the customers.

Figure 7:
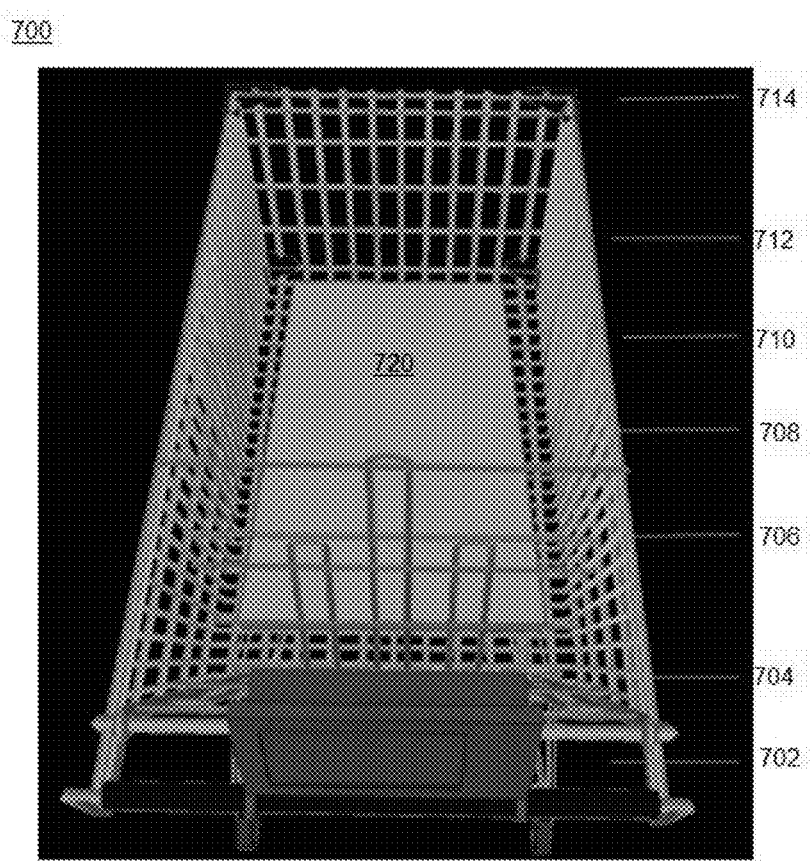
FIG. 7 is a schematic diagram of exemplary shopping cart inside offline shopping store for use by a customer, according to an embodiment of the present invention.

According to an embodiment of the present invention, the shopping cart (700) includes a tablet (702) embedded within pre-fabricated frame, as shown in FIG. 7. The tablet includes a display (740) (not shown in figure) that is configured to display promotional offers about the products/items scanned by the customer and placed in the basket (720). The tablet further includes a keyboard (for example, keyboard) that is configured to enable the customer to enter product details desired by the customer. The shopping cart (700) further includes a Wi-Fi receiver (not shown in the figure). The shopping cart (700) further includes a bar code scanner (704), as shown in FIG. 7.

The shopping cart (700) further includes camera (706) that are concealed and configured to take pictures and send pictures to backend system. The shopping cart 700) further includes a weighing scale (708) that is concealed inside a frame of the shopping cart. The shopping cart (700) further includes sensors (710). The shopping cart (700) further includes a trolley insert (712) that covers the side of the shopping cart. The shopping cart (700) further includes a sensor (714) that is configured to match all data from the bar code scanner (704), the camera (706), and the weighing scale (708).

Figure 8:
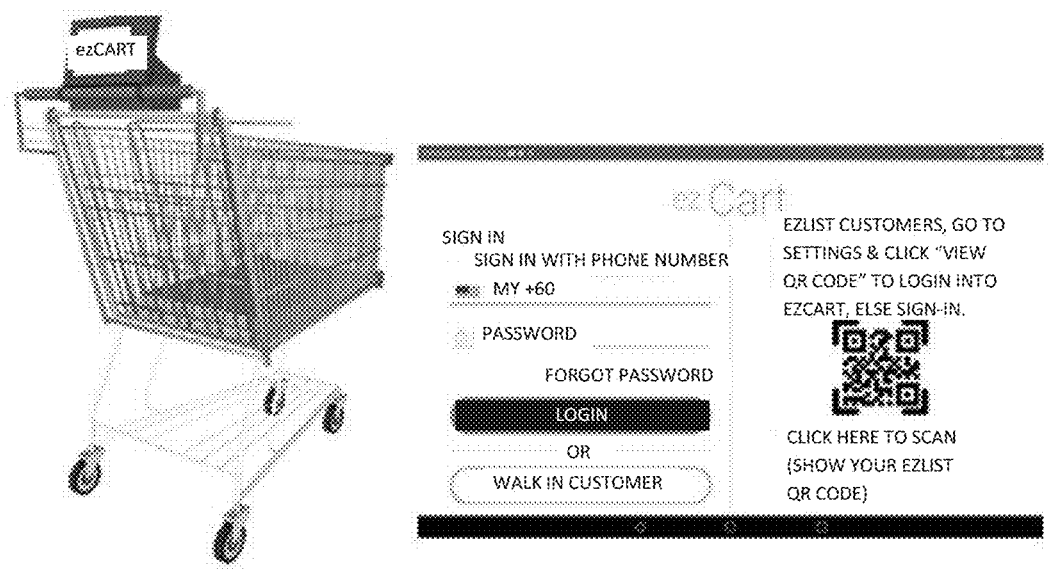
FIG. 8 is a schematic diagram of login by the customer on the exemplary shopping cart inside offline shopping store, according to an embodiment of the present invention.
Figure 9:
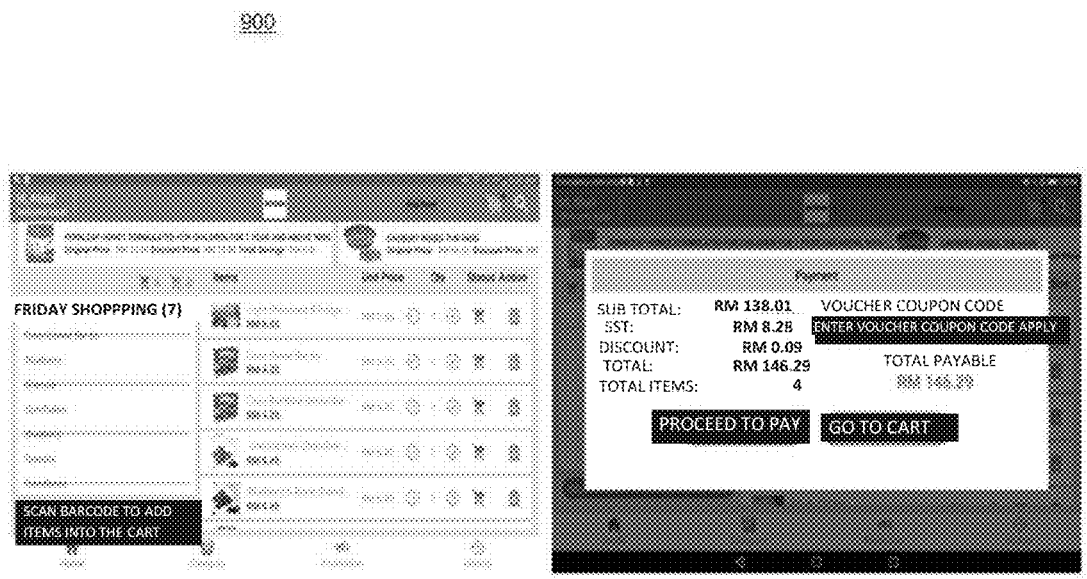
FIG. 9 is a schematic diagram of exemplary shopping list retrieved by a customer from the shopping system, according to an embodiment of the present invention.

According to an embodiment of the present invention, the customer may choose to visit the offline store based upon dynamic promotions and pricing offered by the retailers. The customer may access the shopping cart (700) inside the offline store and may complete login process first, as shown in FIG. 8. In case of successful login, the customer may retrieve his/her shopping list (as shown in FIG. 9), that he/she created earlier using the shopping list module (202), and may add desired items of the shopping list in the shopping cart by scanning them with the scanner (704).

Further, in case the customer add any item inadvertently or deliberately without scanning the item first, the camera (706) may still capture the product image and send the product image to the back end system of the store that may check/verify whether the customer scanned the product before inserting in the shopping cart (700). In case, the customer missed scanning of any product, the backend system may display a notification to the customer to scan the product first. Those skilled in the art will appreciate that such cross-checking or counter-checking by the backend system may help avoiding a potential fraud by any customer.

Figure 10:
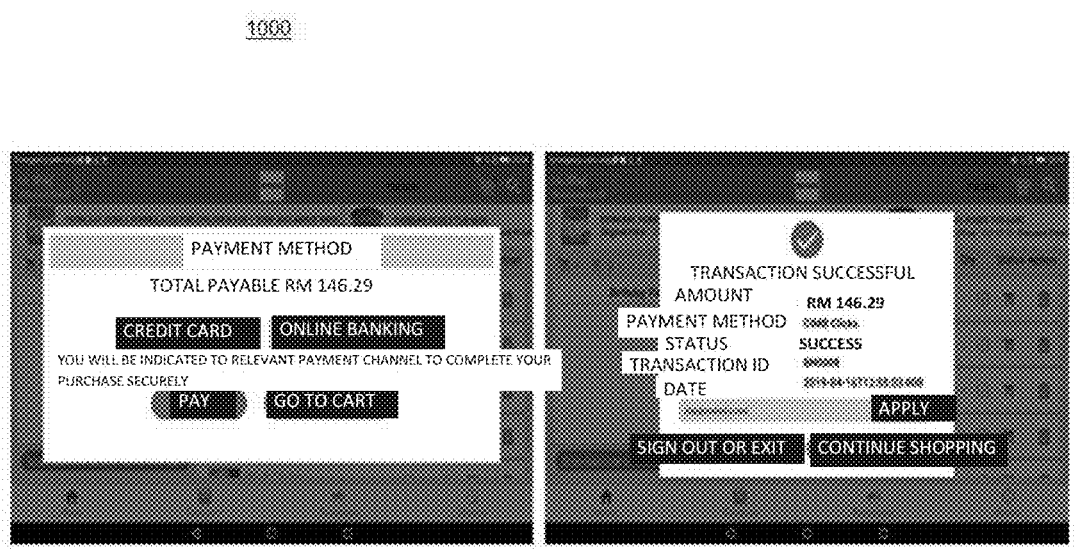
FIG. 10 is a schematic diagram of payment process on the exemplary shopping cart, according to an embodiment of the present invention.

After adding all items of shopping list inside the shopping cart (700), the customer is enabled to make the payment on the shopping cart itself, as shown in FIG. 10. The customer may choose a payment method, make the payment, and may perform self-checkout without joining any queue.

Figure 11:
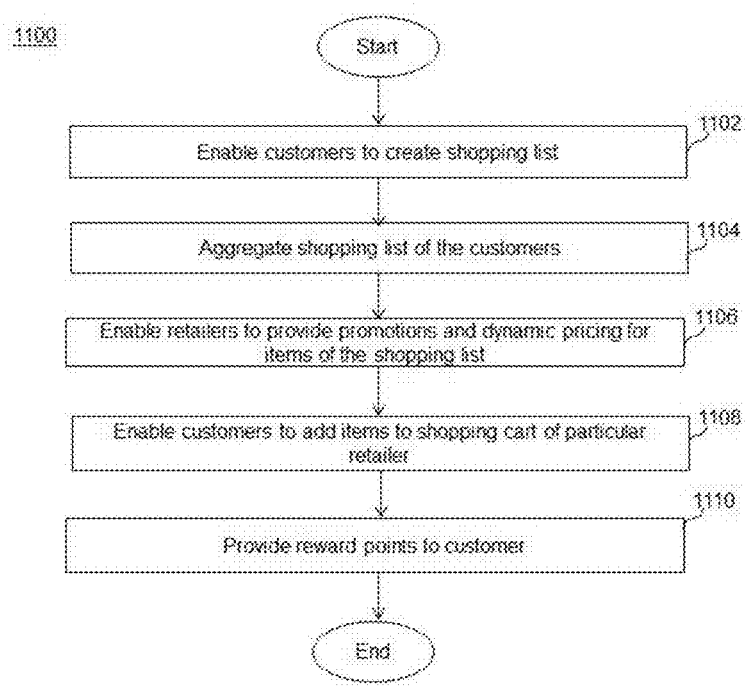
FIG. 11 depicts an exemplary flowchart illustrating a method for facilitating shopping of customers from offline retailers, according to an embodiment of the present invention.

FIG. 11 illustrates an exemplary flowchart of a shopping method for facilitating shopping of customers from various retailers, according to an embodiment of the present invention. Initially, at step 1102, customers are enabled to create their shopping lists. In an embodiment, customers are enabled to search item based on product type, product, and brand. The customer may create multiple shopping lists as well, for example, for their party, vacation or kids.

At step 1104, the shopping lists of the plurality of customers are aggregated. Further, the aggregated shopping list is shared with a plurality of retailers, manufacturers, and fast moving consumer goods company (FMCG). Further, local demand of customers for a geographic location may be aggregated, and the aggregated local demands may be provided to the nearby offline stores for same geographic locations, based upon mobile locations of the customers. Those skilled in the art will appreciate that such geographical tagging will help retailers and manufacturers to assess demand of different items/products from nearby locations and manage their inventory as per local demand. Further, the shopping list may be mapped to databases of the plurality of retailers and inform the retailers about their inventory status, based on the shopping list. In an embodiment, artificial intelligence may be used to predict items demanded by customers in future, so as to assist the retailers in managing their inventory. At step 1106, retailers are enabled to provide a dynamic pricing and promotions for items in the shopping list. For example, various retailers may be having specialization in sales of particular items, like a particular retailer may provide discount on beverage items, while another retailer may provide discount on electronic items. Further, different retailers and manufacturers may offer discounts on different days of year. Further, dynamic prices and promotions (such as promotions this week in the store) may be displayed on a display of home page of the system. Further, a total price offered by the plurality of retailers may be compared for the shopping list, and the comparison may be provided to the plurality of customers to help them make a decision about choice of store to purchase items in the shopping list.

At step 1108, the customers are enabled to add items of the shopping list to a cart. In an embodiment, the customers are able to see dynamic pricing of items in their shopping lists and may choose to buy the items in the shopping lists when prices offered by retailers meets their budget. When customer visits the store, the retailers may identify such shoppers based on their profiles on shopping system, and these customers may pay and checkout with cart without queuing.

At step 1110, reward points to the plurality of customers are provided from the plurality of retailers, based upon the payment. For example, based on volume of purchase done by customer, reward points may be added in an account of the customer. The reward points may be exchanged for items or cash as reward by the customers.

The shopping system (102) and the method (1100) performed by the shopping system (102) advantageously provides enhanced shopping experience of customers with traditional brick and mortar shopping stores. For example, the shopping system (102) advantageously enables customers to check dynamic pricing of items in the shopping list and may book the product whenever he gets best offer. Further, the shopping system (102) advantageously assists the retailers in managing their inventory. Further, the shopping system (102) advantageously provides precise demand to offline retailers about who, what, and when of shopping requirements of customers. The retailers may use such insights to offer the consumer's dynamic demand based prices and promotions.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A shopping system for facilitating shopping of customers from retailers, the shopping system connected to a plurality of consumer devices and a plurality of retailer systems via a network, comprising a processor and a memory, the memory storing:
    a shopping list module configured to enable a plurality of customers to create their shopping list having a plurality of items;
    a retail module configured to enable a plurality of retailers to provide a dynamic pricing and promotions for items in the shopping list; and
    a cart module configured to enable the plurality of customers to choose a retailer based upon the product availability, pricing, and promotions and book a shopping cart with the retailer;
    wherein the shopping cart comprises a bar code scanner, a camera that is concealed and configured to take images and send images to a backend system of a store, a weighing scale concealed inside a frame of the shopping cart; and
    a sensor configured to match all data from the bar code scanner, the camera, and the weighing scale;
    wherein when a customer adds any product inadvertently or deliberately without scanning the product first, the camera still captures an image of the product and sends the image of the product to the backend system that verifies whether the customer has scanned the product before inserting the product in the shopping cart;
    further wherein the customer receives a notification about scanning the product first when the backend system determines that the product is inserted into the shopping cart without being scanned by the customer;
    wherein the shopping list module is configured to enable the customers to keep track of unused products, and the shopping list module reminds the customers if the same products are unused or unfinished;

wherein the shopping list module is configured to enable the customers to keep track of expiry date of stock of products at home and to utilize the inventory data provided by retailers to keep track of the expiry date of the products; and wherein the plurality of retailers are allowed to utilize the shopping list to get insights into customers real time demand for offering promotions on the items in demand.

2. The shopping system of claim 1, wherein the shopping list module is further configured to enable the plurality of customers to share their shopping list with their family members and friends.

3. The shopping system of claim 2, wherein the shopping list module configured to enable the family members and friends to edit the shopping list.

4. The shopping system of claim 1, wherein the shopping list module is further configured to compare total price and product availability offered by the plurality of retailers for the shopping list, and provide the comparison to the plurality of customers.

5. The shopping system of claim 1, wherein the retail module is configured to aggregate the shopping lists of the plurality of customers, and share the aggregated shopping list with a plurality of retailers.

6. The shopping system of claim 1, wherein the retail module is configured to tag geographic location of the plurality of customers and provide to the plurality of retailers.

7. The shopping system of claim 1, wherein the retail module is configured to map the shopping list to databases of the plurality of retailers and inform the retailers about their inventory based on the shopping list.

8. The shopping system of claim 1, wherein the retail module is configured to use demographic details of the customers to provide promotional offers to the customers.

9. The shopping system of claim 1, wherein the retail module is configured to predict items that will be demanded by customers.

10. The shopping system of claim 1, further comprising a reward module configured to provide rewards to the plurality of customers from the retailers or partners based upon a payment.

11. A computer-implemented method for facilitating shopping of customers from retailers using a shopping system connected to a plurality of consumer devices and a plurality of retailer systems via a network, the computer-implemented method comprising:

enabling a plurality of customers to create their shopping list having a plurality of items;

aggregating the shopping lists of the plurality of customers, and sharing the aggregated shopping list with a plurality of retailers;

enabling the plurality of retailers to provide a dynamic pricing and promotions for items in the shopping list;

enabling the plurality of customers to choose a retailer based upon the pricing and book a shopping cart with the retailer, wherein the shopping cart comprises a bar code scanner, a camera that is concealed and configured to take images and send images to a backend system of a store, a weighing scale concealed inside a frame of the shopping cart, and a sensor configured to match all data from the bar code scanner, the camera, and the weighing scale;

wherein when a customer adds any product inadvertently or deliberately without scanning the product first, the camera still captures an image of the product and sends the image of the product to the backend system that verifies whether the customer has scanned the product before inserting the product in the shopping cart;

further wherein the customer receives a notification about scanning the product first when the backend system determines that the product is inserted into the shopping cart without being scanned;

enabling the plurality of customers to keep track of unused products, and enabling the plurality of retailers to keep track of their inventories, and sending reminder to the customers if the same products are unused or unfinished;

enabling the customers to keep track of expiry date of stock of products at home and utilizing the inventory data provided by retailers to keep track of the expiry date of the products; and utilizing the shopping list by the plurality of retailers to get insights into customers real time demand and offering one or more promotions on the items in demand.

12. The computer-implemented method of claim 11, wherein the aggregating further comprises mapping the shopping list to databases of the plurality of retailers and informing the retailers about their inventory based on the shopping list.

13. The computer-implemented method of claim 11, further comprising using demographic details of the customers to provide promotional offers to the customers.

14. The computer-implemented method of claim 11, further comprises assisting the plurality of retailers to manage their inventory.

15. The computer-implemented method of claim 11, further comprising providing rewards to the plurality of customers from the plurality of retailers, based upon a payment.

* * * * *